United States Patent [19]

Jennings et al.

[11] Patent Number: 5,115,635
[45] Date of Patent: May 26, 1992

[54] ANALYTICAL FLOW METER BACKUP

[75] Inventors: Tyler R. Jennings, West Palm Beach; Louis J. Larkin, Lake Clarke Shores; Rodney O. Johnson, Lake Worth, all of Fla.

[73] Assignee: United Technologies Corporation, Hartford, Conn.

[21] Appl. No.: 615,944

[22] Filed: Nov. 20, 1990

[51] Int. Cl.$^5$ .............................................. F02C 9/28
[52] U.S. Cl. .................................. 60/39.03; 60/39.281
[58] Field of Search ................ 60/39.281, 734, 243, 60/39.03

[56] References Cited

U.S. PATENT DOCUMENTS

| | | | |
|---|---|---|---|
| 3,018,621 | 1/1962 | Arnett et al. | 60/39.281 |
| 4,212,161 | 7/1980 | Newirth et al. | 60/39.281 |
| 4,228,650 | 10/1980 | Camp | 60/39.281 |

Primary Examiner—Louis J. Casaregola
Attorney, Agent, or Firm—Edward L. Kochey, Jr.

[57] ABSTRACT

A gas turbine engine control system sends a demand signal to a fuel throttle valve. The demand signal is modified by a measured fuel flow signal during normal operation. Operating parameters such as pump speed and recirculation valve portion are sensed. Combining these sensed parameters with the known geometry of the system, a calculated pressure differential between a point upstream of the throttle valve and a point in the combustor is determined. This calculated pressure differential is applied to the known geometry of the system from before the throttle valve to the combustor, including sensed opening of the throttle valve. A calculated flow is thus obtained and compared to the measured flow. An excessive difference between the measured and calculated flows indicates flow meter error. In such a case the calculated flow is substituted for the measured flow in modifying the demand signal.

5 Claims, 3 Drawing Sheets

ANALYTICAL FLOW METER BACKUP

The Government has rights in this invention pursuant to a contract awarded by the Department of the Air Force.

TECHNICAL FIELD

The invention relates to gas turbine engines and in particular to the control of such engines.

Background of the Invention

Variable load gas turbine engines, and in particular aircraft engines require variations in fuel input to maintain the desired output. This is usually a fuel flow demand to which a throttle valve responds. Fuel flow to the combustor of the gas turbine engine is thereby controlled.

It is possible to operate such an engine by measuring the fuel flow, and feeding the measured flow signal back for fuel flow error determination. Since, however, engine thrust is the ultimate desired parameter, other dominant feedbacks may be used such as engine pressure ratio or turbine inlet temperature.

Regardless of the selection of the primary feedback, other signals must be fed back for successful operation. Maximum limits, including temperature and rotational speed, must not be exceeded. Too high a rate of increase in fuel flow can result in a compressor stall. Too rapid a rate of decrease, or too low a fuel flow, can result in a combustor flame out.

Thus, regardless of the primary control variable there is a need for actual fuel flow feedback at times to modify the fuel flow demand signal Erroneous flow feed back signals will fail to protect the engine.

Rotating volumetric flow meters are frequently used to measure the actual fuel flow to the combustor. This type meter has the advantage that it is lightweight and causes minimal resistance to flow. They, however, are subject to error because of bearing wear. Both the volumetric meter and orifice type meters are subject to substantial error in the presence of partially vaporized fuel.

In addition to the heat from the engine, modern aircraft use the fuel flow as a heat sink for other cooling. Because of the low fuel flow during engine starting, vaporization of the fuel can be expected. The desire during starting is to establish a fuel flow rate sufficient for idle speed. Vapor in the meter provides an erroneous high flow signal which would operate in the feedback system to further decrease flow. This delays the start, which is particularly disconcerting during an inflight restart.

Even if the vapor presence could be detected to open the throttle valve more, a time comes when the totally liquid fuel follows the vapor. The sudden flow increase caused, could result in a sudden combustor pressure increase and a compressor stall.

SUMMARY OF THE INVENTION

It therefore would be advantageous to have a simple reliable lightweight solution which would provide a redundant fuel flow signal. Such redundant signal would be substituted for the measured flow signal when the measured flow signal is detected to be erroneous or can be assumed to be erroneous.

A fuel demand signal is modified by various limits and fed to the throttle valve controller which controls the fuel flow to the combustor. The fuel flow to the combustor is measured and a signal fed back for several of the fuel demand modifications.

The pump characteristics, the piping geometry and valve characteristics are known Sensing physical parameters representative of pump speeds and valve position permits calculation of the expected flow. Corrections are made for recirculation flow and afterburner flow since these flows do not pass to the combustor. The resulting calculated flow signal is then substituted for the measured flow feedback signal.

The selection of the feedback signal is based on an excessive difference between the two signals indicative of a measured flow error. Below idle speed where vapor can be expected, it is assumed that the measured flow is in error and the comparison step may be omitted. This redundant feedback signal avoids operating problems caused by metering error.

DESCRIPTION OF THE PREFERRED EMBODIMENT

Figure 1:
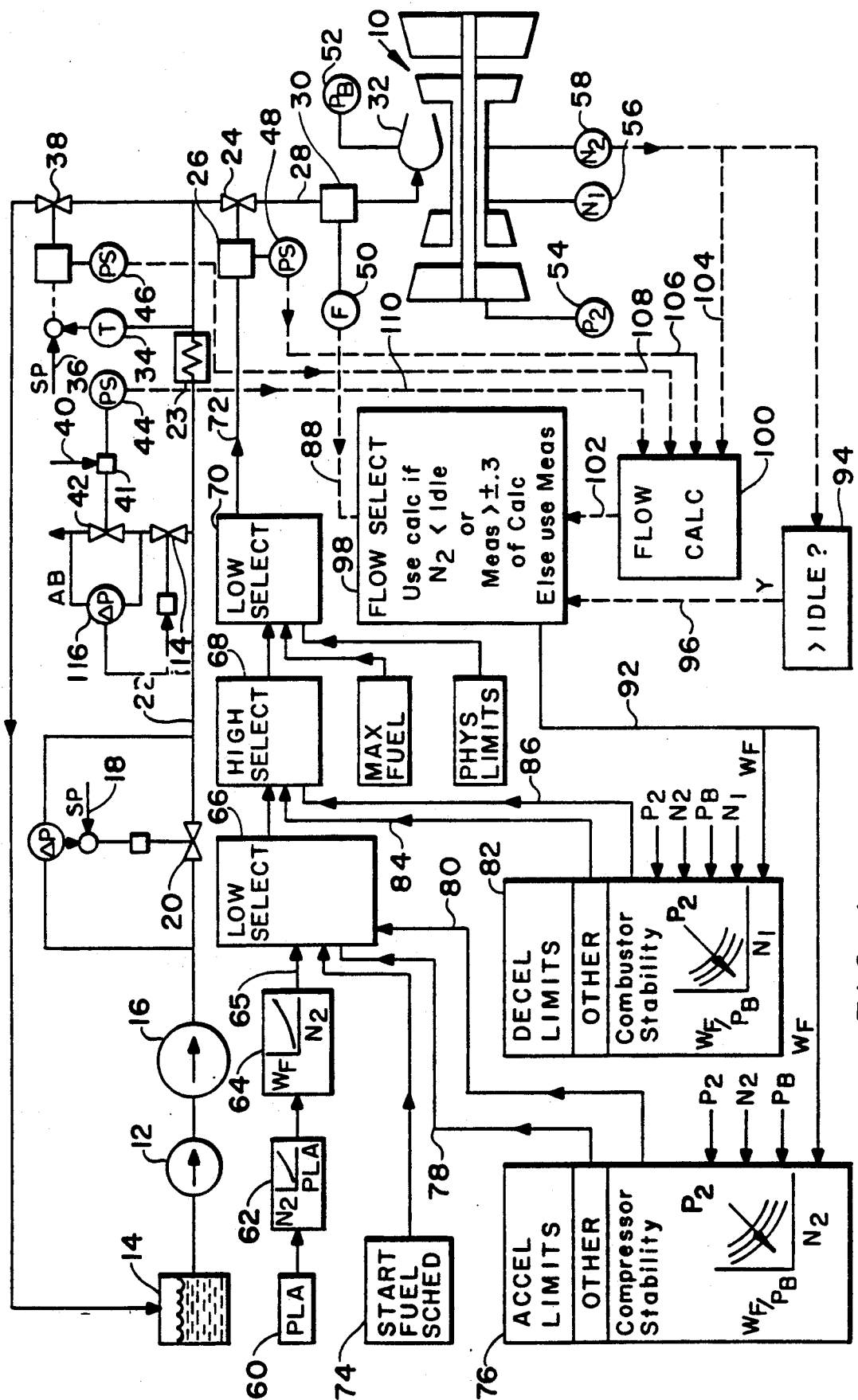
FIG. 1 is a schematic of the fuel flow system and the control logic.

FIG. 1 first illustrates the fuel flow system to the gas turbine engine 10. At constant speed centrifugal booster pump 12 takes suction from fuel tank 14 supplying main fuel pump 16. This is the centrifugal pump directly connected to the gas turbine engine and therefore operates at variable speed as a function of the engine speed. A preselected pressure set point 18 is maintained across back pressure valve 20.

Fuel flow conduit 22 carries the fuel through a heat exchanger 23, where it cools the engine oil and hydraulic fluid, and on to throttle valve 24. An actuator 26 modulates the throttle valve varying the fuel flow through conduit 28, which includes a rotating type fuel flow meter 30. The fuel passes to and burns in combustor 32.

The temperature of the fuel is sensed by temperature sensor 34 and compared to a set point temperature 36. On excessive temperature, recirculating valve 38 is opened to recirculate fuel back to fuel tank 14.

Also taken from conduit 22 is afterburner flow when required. Demand for afterburner flow is established by signal 40 operating through actuator 41 on valve 42.

Position sensor 44 senses the position of the afterburner valve while position sensor 46 senses the position of the recirculation flow valve. Position sensor 48 senses the position of throttle valve 24 while flow meter transmitter 50 sends a signal indicative of the flow measured by flow meter 30. Pressure sensor 32 senses the pressure in the combustor while pressure sensor 54 senses P2 which is the static pressure at the inlet of the compressor. Speed sensor 56 senses N1 or the low compressor speed while speed sensor 58 senses N2 or the high speed compressor speed.

During normal operation the pilot sets a desired position of the power lever angle 60 establishing a signal from which is converted a desired N2 (high pressure compressor speed) signal in function generator 62. This N2 is converted to a requested fuel flow signal in function generator 64. This desired fuel flow signal 65 passes through low select logic 66, high select logic 68 and further low select logic 70 sending a fuel demand signal 72 to controller 26. This sets the position of throttle valve 24 controlling the fuel feed to engine 10.

Low select logic 66 also receives the fuel demand signal from start fuel schedule 74. This fuel demand signal is substantially a fixed flow quantity representing the fuel rate determined to allow successful combustor ignition This is operative only during starting of the engine.

Low select logic 66 also receives signals from acceleration limit logic 76. Effectively, the pilot demand or the start fuel schedule is limited in the rate at which the fuel demand can increase by the acceleration limits from logic 76. Various known limits pass through control line 78 and in particular the compressor stability limit passes through control line 80. Under normal operation the signal from meter 50 indicative of measured fuel flow to the combustor is fed into this logic along with burner pressure from sensor 52. Also the N2 and the P2 signals are introduced. A maximum fuel flow over burner pressure is established in the logic as a function of N2 and P2. This signal is multiplied by burner pressure and sent through control line 80.

The ultimate signal selected from low select 62 is sent to the high select 68 where it is auctioned with deceleration limits from deceleration limit logic 82. Various common limits pass through control line 84 and in particular a combustor stability limit passes through line 86. This combustor stability limit is a function of N1 and P2 where the logic establishes the minimum flow as a ratio of fuel flow over burner pressure. Under normal operation the actual measured fuel flow to the combustor is used.

The fuel demand signal from high select 68 is passed to low select 70 where it is auctioned with the maximum fuel flow permitted and other physical limits such as turbine speed or temperature. The ultimate fuel demand signal passed to controller 26 passes through control line 72 from this low select 70.

The measured flow signal passing through line 88 is normally passed through the flow select logic 90 as the selected flow signal 92. The N2 signal 58 is compared at logic 94 to the prescribed idle speed, with the above idle signal 96 passing to flow select logic 98 when the speed reaches idle. Flow calculation logic 100 sends the calculated flow signal 102 to flow select logic 98, where the flow selection is made between this calculated flow signal 102 and the measured flow signal 88.

Flow calculation logic 100 establishes an analytical flow meter backup signal 102 based on the known characteristics of the pumps, piping and valves and the detection of various physical operating parameters of these. Signal 104 indicative of the high pressure compressor speed is a measure of the speed of main fuel pump 16 which is directly connected thereto. Signal 106 is indicative of the position of throttle valve 24, the characteristic opening of this valve being known as a function of position. Signal 108 indicates the position of recirculating valve 38. Signal 110 indicates the position of afterburner valve 42.

The purpose of flow calculation logic 100 is to determine the flow to the combustor which would be expected based on the physical operating parameters and known hardware characteristics. This is compared to the measured fuel flow, and when the difference between the two is beyond a preselected amount, the analytical flow meter backup signal from the flow calculation is used. Below idle speed where vaporization of the fuel, before or in the flow meter can be expected, and at flow readings where flow meters are notoriously inaccurate, the step of comparing the measured and calculated flow may be omitted and the calculated flow used.

The flow select logic 68 uses the calculated flow if N2 is below idle. It also uses the calculated flow if the measured flow deviates more than 30 percent from the calculated flow indicating a flow sensor failure. In these cases the calculated flow signal is sent through line 92 and used for acceleration limit logic 76 and deceleration limit logic 82.

Where the above relationships are not exceeded, flow select logic 98 passes the measured fuel flow signal 88 through control line 92 for the acceleration and deceleration limits.

Figure 2:
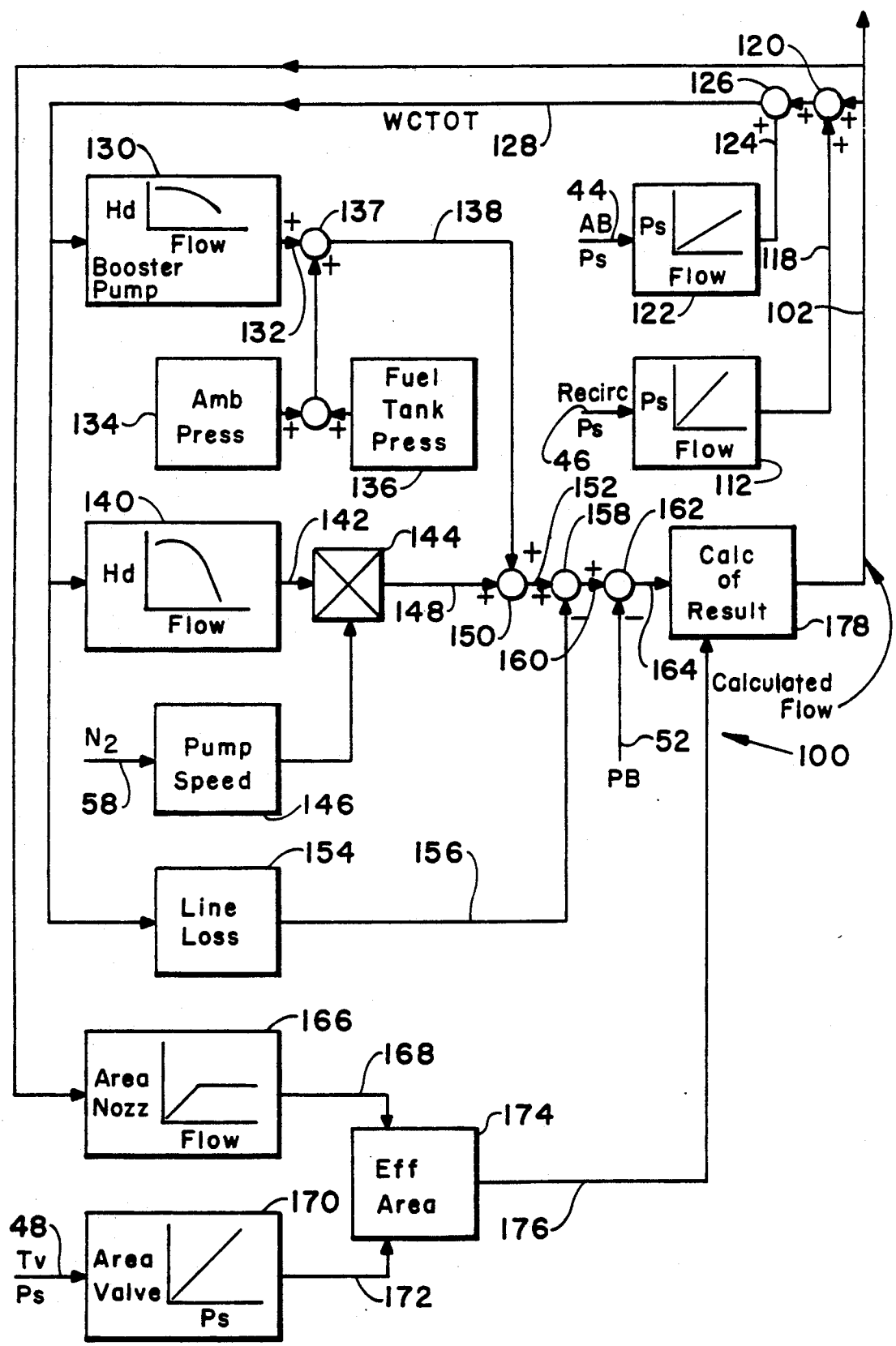
FIG. 2 is an overview of the calculation logic.

FIG. 2 presents an overview of the flow calculation logic 100. The output calculated flow 102 is also the input for this iterative process. The calculated flow is that flow passing through the throttle valve and to the combustor. In the event of recirculation or afterburner flow, the flow through the upstream portion of the system is greater than the burner flow.

The position signal 46 of recirculating flow valve 38 passes to function generator 112 where flow is established as a function of valve position and pump speed. Since valve discharge pressure is typically low relative to supply pressure, and maximum recirculation flow is a small percentage of pump design flow, the errors induced by this simple approximation are inconsequential. This recirculating flow signal 118 is added to flow signal 102 at summation point 120.

Afterburner valve position 44 is passed to function generator 122 to establish an afterburner flow signal 124. The regulator valve 114 maintains a fixed pressure differential across valve 44, in response to a sensed pressure drop 116. Therefore, flow through this valve is substantially known as a function of valve position. This flow can be established and added at summation point 126 to achieve a total flow signal through line 128. This represents a total of combustor flow plus recirculated flow plus afterburner flow. Accordingly, this is the flow passing from the fuel tank through booster pump 12, main pump 16 and a major portion of conduit 22.

This flow signal passes into booster pump function generator 130, the signal 132 representing the pressure rise in that pump. This pressure rise is added to ambient pressure 134 and the fuel tank pressure 136 to achieve and actual pressure signal in line 138.

Function generator 140 represents the flow characteristics of main fuel pump 116 and receives the total flow input signal The output signal 142 is modified at multiplier 144 as a function of the pump speed 146 established by the known gear ratio. Main fuel pump head 148 is added to the booster pump discharge pressure 138 at summation point 150 to achieve a net pressure signal 152.

Again, using the total flow 128, the line loss is calculated at 154 for the conduit from the main fuel pump to the throttle valve. In the condition illustrated here, the most substantial portion of the pressure drop occurs before the afterburner the recirculating flows are taken off, and accordingly, the reduced flow sections of the conduit need not be handled separately. The line loss signal through control line 156 passes to summation point 158 where subtraction provides a signal 160 representative of the pressure upstream of the throttle valve. Burner pressure signal 52 is subtracted at summation point 162 producing a signal 164 representative of the difference in pressure between a point upstream of the throttle valve 24 and the combustor 32. The pressure available differential between the upstream end of the throttle valve and the combustor, along with the known physical geometry of that portion of the circuit, is used to calculate the analytical flow meter backup signal.

The flow nozzles for the combustor illustrated here do not have a constant flow area. In order to achieve better distribution and atomization at lower ratings, the areas of the nozzles are reduced at lower flows. Therefore, the area of that portion of the circuit is a variable which is a function of the flow through the nozzles. Accordingly, the last calculated fuel flow to the combustor is used and applied to function generator 166 achieving an output 168 representative of the flow area of the nozzle. It is noted that the flow used for this calculation does not include the afterburner and recirculating flows which are included on the earlier calculations.

Throttle valve position 48 is fed to function generator 170 which establishes the flow area 172 of the valve in accordance with the known relationship between valve position and effective area. In logic block 174 an effective flow area similar to an orifice representing the throttle valve and the nozzles in series is calculated presenting an overall effective area in line 176. In this case, the actual line loss is insignificant, but if it were greater this also would have to be considered.

Calculation of result logic 178 using the overall effective area 176 and the available pressure differential calculates the flow 102 in accordance with $$\text{Flow} = \text{Constant} \times \text{Area} \times \sqrt{\text{Density}} \times \sqrt{DP}.$$

It is pointed out that the effective flow area based on the throttle valve and the nozzle resistances are calculated prior to applying the pressure differential. Theoretically it would be possible to calculate the pressure drop through one of them based on the last calculated flow and use the remaining portion of this section of circuit to calculate the new flow. However, investigation has shown through error analysis that the slight errors occurring in the overall calculation are exacerbated by such an approach, and accordingly the entire circuit from upstream of the throttle valve to the combustor should be used as the determinative resistance.

Figure 3:
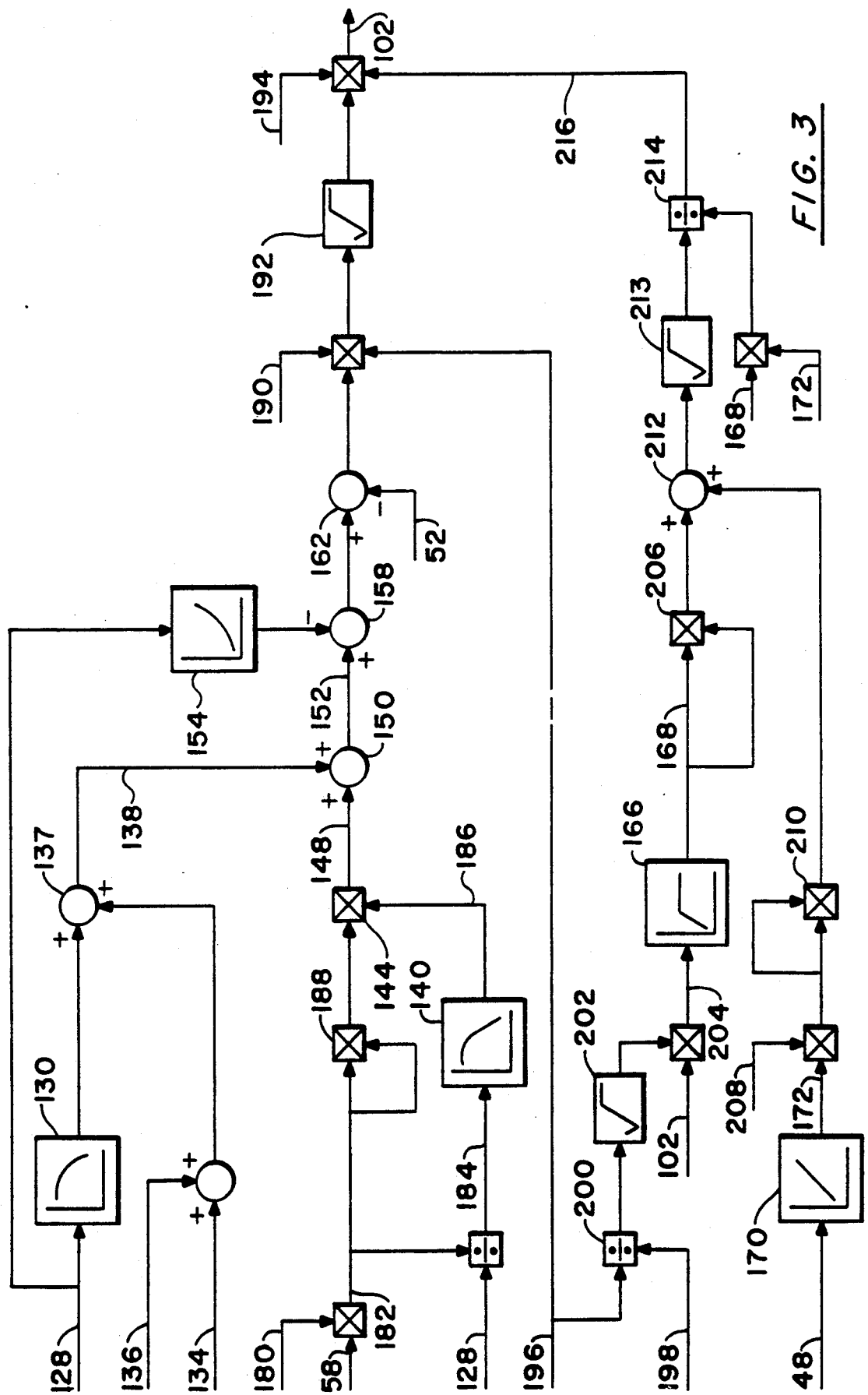
FIG. 3 is a more detailed diagram of the calculation logic.

FIG. 3 illustrates in somewhat more detail the overall flow calculation logic of FIG. 2.

Total flow signal 128 passes through booster pump function generator 130 producing a head rise across the pump signal Ambient pressure signal 134 and fuel tank pressure 136 are summed and added at summation point 137 to the booster pump head rise signal.

N2 signal 58 is modified by gear ratio signal 180 to produce the pump speed signal 182. The total flow signal 128 is divided by the pump speed signal 182 producing a signal 184 equal to the flow divided by speed. Function generator 140 produces a normalized centrifugal pump pressure rise 186. This is combined at multiplier 144 with the speed signal which has been squared at multiplier 188 to produce the overall pump head signal 148. This is summed with the booster pump rise at summation point 150. The resulting signal 152 is summed at point 158 with the output signal from the line loss function generator 154. Burner pressure 52 is subtracted at summation point 152 to obtain the available pressure drop from upstream of the throttle valve to the combustor.

The signal modified by the fuel constant 190 and the square root function 192 is used at multiplier 194 to obtain the flow signal 192. The actual fuel density 196 based on fuel temperature as measured by temperature sensor 34 is divided by the fuel density at 80 F 198 at point 200. The square root 202 of this density ratio is applied to the last calculated combustor flow 102 to achieve a combustor flow 204 density corrected to 80 F. Function generator 166 which is defined at 80 F establishes the effective area 168 which is squared at point 206.

Throttle valve position 48 at function generator 170 establishes a signal 172 representative of the throttling valve area. A throttling valve discharge coefficient 208 is applied and the result squared at point 210. This is summed at summation point 212 with the output signal from multiplier 206. The square root of this sum 213 is obtained and at division point 214 it is divided by the product of the nozzle area 168 and the valve area 172. This results in an effective area 216 of the throttling valve and nozzles in series which is multiplied at multiplication point 194 with the signal from square root function 192 to obtain the calculated flow result 102.

The calculated analytical feedback flow signal is thus substituted for a measured flow signal when the measured signal is determined or assumed to be erroneous. Safety of the engine is thereby assured.

What is claimed is:

1. A method of operating a gas turbine engine comprising:
    sending a control signal to a fuel flow throttle valve;
    modulating said throttle valve in response to said control signal;
    measuring fuel flow passing through said throttle valve and establishing a measured flow signal;
    using said measured flow signal to modify said control signal;
    detecting the physical operating parameters of the pump and valves in the fuel flow system;
    calculating a calculated flow based on said operating parameters and establishing a calculated flow signal;
    comparing said measured flow signal and said calculated flow signal; and
    substituting said calculated flow signal for said measured flow signal to modify said control signal when said measured flow signal and said calculated flow signal differ by more than a preselected amount.

2. A method of operating a gas turbine engine as in claim 1:
    detecting engine speed during engine startup; and
    substituting said calculated flow signal for said measured flow signal during startup below idle speed independent of comparing said measured flow signal and said calculated flow signal.

3. A method of operating a gas turbine engine as in claim 1:
    wherein the step of detecting the physical operating parameters include detecting pump speed and detecting valve position.

4. A method of operating a gas turbine engine as in claim 1; wherein the step of calculating a calculated flow comprises:
    determining pump pressure increase based on the last calculated flow and sensed pump speed;

determining pressure loss based on known geometry of the plumbing upstream of said throttle valve, and the last calculated flow;

combining said pressure increase and said pressure loss decrease to obtain a pressure value at a location upstream of said throttle valve;

determining the pressure in said combustor, and calculating the pressure differential available between said combustor and said location upstream of said throttle valve; and calculating the flow resulting from said calculated pressure differential across the known geometry of said throttle valve plus all the line and components in series between said throttle valve and said combustor.

5. A method of operating a gas turbine engine as in claim 4, including also:

sensing the position of a recirculation valve located in a line connected to remove fuel from a location downstream of any pumps;

* * * * *